Figure 1:
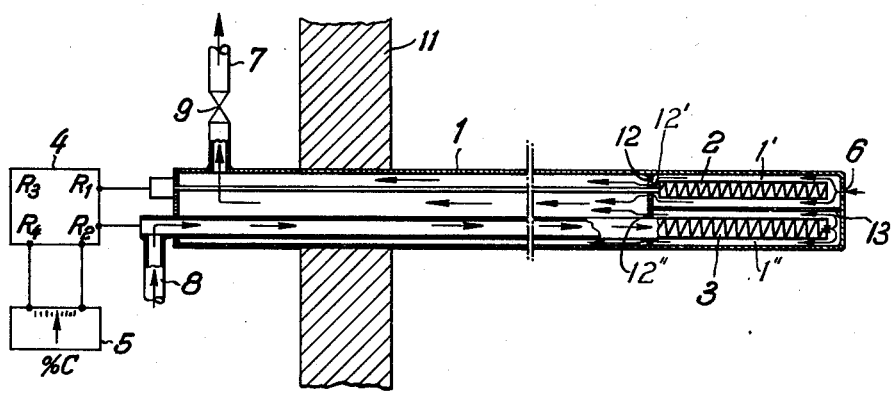

United States Patent Office 2,935,866
Patented May 10, 1960

2,935,866
APPARATUS FOR MEASURING THE CARBON LEVEL OF FURNACE GASES

Theodor Schmidt and Jochen Wünning, Essen, Germany, assignors to Firma Indugas, Essen, Germany, a corporation of Germany Application December 18, 1957, Serial No. 703,658

Claims priority, application Germany December 20, 1956

4 Claims. (Cl. 73—27)

Our present invention relates to a process and an apparatus for measuring the carbon level of industrial gases, especially of hot gas mixtures such as those present in the interior of a furnace.

It is known that certain materials having a high affinity for carbon, such as iron and its alloys, will be carbonized to a certain extent when brought into a carbon-containing atmosphere at elevated temperatures, the degree of this carbonization depending upon the character of such atmosphere as well as upon its temperature and its pressure. With the active carbophilous material present in homogeneous phase, the degree of its carbonization at equilibrium will be uniquely determined for any particular gas mixture of given pressure and temperature, it being thus possible to ascribe to such gas mixture a specific carbonization coefficient or carbon potential which is a measure of the carbon concentration produced by it in a suitable (generally ferrous) control substance.

It is, accordingly, possible to determine the chemical composition of a gas mixture from its carbonizing or decarbonizing action upon an iron or iron-alloy probe of limited cross-section, either through chemical analysis of such probe or by a measurement of its electrical resistance which varies with its carbon content. The first of these methods requires the removal of the probe from the atmosphere to be tested and is, therefore, unsuitable for most industrial applications. The second method allows the probe to be left permanently installed but suffers from the drawback that the resistance of the probe is affected not only by its carbon content but also by the temperature of the gas mixture with which it is in contact, thereby requiring continuous recalibration of the measuring instrument to correct for temperature fluctuations.

Our present invention has for its general object the provision of a process for ascertaining the carbonization coefficient of a hot gaseous atmosphere by electric resistance measurements carried out in such manner as to enable the taking of temperature-independent readings; another object is to provide simple means for carrying this process into practice.

A feature of our invention resides in simultaneously introducing two preferably identical carbophilous resistance elements into the atmosphere to be tested, so that both elements assume the temperature of this atmosphere after thermal equilibrium has been established, exposing one of these elements to direct contact with the said atmosphere while shielding the other element from such contact and exposing the latter instead to a gaseous medium of predetermined carbon coefficient, and measuring the difference in the electrical resistances of the two elements. Such resistance measurement may be conveniently carried out by means of a Wheatstone bridge circuit having the two resistance elements connected in adjacent arms thereof. Advantageously, the gaseous medium in contact with the second or control resistor is one whose carbonization coefficient is very low, i.e. one adapted to reduce the carbon content of a ferrous substance to substantially zero.

According to another feature of our invention, both resistance elements are enclosed in a common housing subdivided into two compartments of which one, containing the testing resistor, is open toward the atmosphere while the other, containing the control resistor, is filled with the gaseous medium of predetermined carbonization coefficient. For calibrating purposes, a connection may be provided between the two compartments whereby both resistance elements may be swept by the same gaseous medium.

Figure 2:
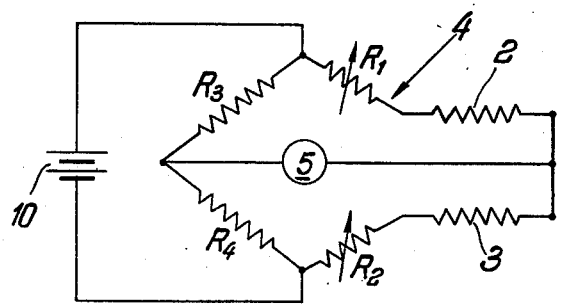

The above and other objects, features and advantages of our invention will become more fully apparent from the following detailed description of a preferred embodiment, reference being had to the accompanying drawing in which:

Fig. 1 is a schematical view of a measuring device according to our invention; and Fig. 2 is an electric circuit diagram of the device shown in Fig. 1.

As shown in Fig. 1, a tubular probe 1 resembling a pyrometer is introduced through a furnace wall 11 into a chamber containing a gaseous mixture to be tested for its carbon level. The inserted extremity of probe 1 is divided, by means of a diaphragm 12 and a partition 13, into an upper compartment 1′ and a lower compartment 1″ respectively containing a testing resistor 2 and a control resistor 3. The two resistors, which preferably are of identical dimensions and chemical composition, are made of a ferrous substance and have a high surface-to-volume ratio so that their electrical conductivity will be materially affected by surface carbonization. The upper compartment 1′ is provided with an orifice 6 through which it communicates directly with the furnace atmosphere, the gaseous mixtures within the furnace passing through this orifice and through an aperture 12′ in diaphragm 12 to escape into the open via an outlet 7 provided with a valve 9. A gaseous medium of predetermined carbonization coefficient enters the lower compartment 1″, containing the control resistor 3, through an inlet duct 8 and passes through another aperture 12″ of diaphragm 12 toward outlet 7.

The resistors 2 and 3 are connected, as shown more clearly in Fig. 2, in adjacent resistance arms $R_1$, $R_2$, $R_3$, $R_4$ of a Wheatstone bridge 4 energized from a source of current here shown schematically as a battery 10. A meter 5 (e.g. a galvanometer), connected in the output diagonal of the bridge which extends between the junction of probe resistors 2, 3 and the junction of fixed resistors $R_3$, $R_4$, may be calibrated directly in percents of carbon as indicated in Fig. 1. Variable resistors $R_1$ and $R_2$ are connected in series with resistors 2 and 3, respectively, to facilitate calibration of the bridge.

To calibrate the device, it is merely necessary to close the valve 9 whereupon the control gas, admitted under greater-than-atmospheric pressure through tube 8 into the lower probe compartment 1″, will enter the upper compartment 1′ through the apertures 12″ and 12′ of diaphragm 12 and will sweep this upper compartment free of furnace gas as it passes through orifice 6 into the interior of the furnace. With both resistors 2 and 3 now in contact with the same gaseous medium, either or both of resistors $R_1$, $R_2$ may be adjusted to cause the meter 5 to indicate a value corresponding to the known carbonization coefficient of that medium. In this calibrating position the control gas, which should be of a non-oxidizing nature, will also protect the elements 2 and 3 from chemical attack by the furnace atmosphere.

In operation, the valve 9 is opened sufficiently wide to allow the furnace gases to flow past the testing resistor 2 so as to change the resistivity of the latter to an extent readable on the meter 5. This operating position need be maintained only long enough to insure that resistor 2 will reach its carbonization equilibrium before a reading is taken. The length of the probe 1 inside the furnace enables the control gas in tube 8 to reach the temperature of the furnace gases before arriving at resistor 3, hence the device will always be in thermal equilibrium.

With the valves 9 wide open as described above, the passage of control gas from diaphragm aperture 12″ toward outlet 7 will create a partial vacuum adjacent diaphragm aperture 12′ so as to cause entrainment of furnace gases through aperture 12′ and orifice 6, all as indicated by the arrows in Fig. 1. In this manner the resistance element 2 in compartment 1′ will be swept by a gas sample representative of the monetary furnace atmosphere even if the pressure within the furnace is not, or only slightly, higher than atmospheric pressure.

Our invention is, of course, not limited to the specific embodiment described and illustrated but may be realized in various modifications and adaptations without departing from the spirit and scope of the appended claims.

We claim:

1. In an industrial furnace, in combination, a furnace chamber and an elongated tubular probe extending into said chamber, said probe having an extremity inside said furnace chamber divided into a first and a second compartment, a carbophilous resistance element in each of said compartments, said first compartment being provided with an orifice opening into said furnace chamber and with a first internal aperture opening into the interior of said probe, inlet means communicating with said second compartment for admitting into same a gaseous medium of greater-than-atmospheric pressure having a predetermined carbonization coefficient, said second compartment being provided with a second internal aperture communicating with the interior of said probe adjacent said first internal aperture, outlet means at the end of said probe opposite said extremity for discharging said gaseous medium from said second compartment and entrained furnace gases from said first compartment into the open, valve means for closing said outlet means, thereby causing said gaseous medium to enter said first compartment via said internal apertures and to escape into said furnace chamber by way of said orifice, and circuit means connecting said elements in a resistance-measuring circuit, said circuit means including electrical meter means for indicating a difference in the electrical resistances of said elements.

2. The combination according to claim 1, wherein said inlet means comprises an elongated tube extending longitudinally within said probe over a major part of its length located inside said furnace chamber.

3. A device for measuring the carbon level of the atmosphere of a furnace chamber, comprising an elongated tubular probe extending into said chamber, said probe having an extremity inside said furnace chamber divided into a first and a second compartment, a carbophilous resistance element in each of said compartments, said first compartment being provided with an orifice opening into said furnace chamber and with a first internal aperture opening into the interior of said probe, inlet means communicating with said second compartment for admitting into same a gaseous medium of greater-than-atmospheric pressure having a predetermined carbonization coefficient, said second compartment being provided with a second internal aperture communicating with the interior of said probe adjacent said first internal aperture, outlet means at the end of said probe opposite said extremity for discharging said gaseous medium from said second compartment and entrained furnace gases from said first compartment into the open, and circuit means connecting said elements in a resistance-measuring circuit, said circuit means including electrical meter means for indicating a difference in the electrical resistances of said elements.

4. A device according to claim 3, further comprising a transverse diaphragm at said extremity partially closing said compartments, said internal apertures being provided in said diaphragm, said inlet means comprising an elongated tube extending from said opposite end through said diaphragm.

References Cited in the file of this patent

UNITED STATES PATENTS

| | | |
|---|---|---|
| 2,541,857 | Besselmen et al. | Feb. 13, 1951 |
| 2,565,230 | Hebler | Apr. 21, 1951 |
| 2,698,222 | Davis | Dec. 4, 1954 |
| 2,787,904 | Beard | Apr. 9, 1957 |